US007323683B2

(12) United States Patent
Krutchinsky et al.

(10) Patent No.: US 7,323,683 B2

(45) Date of Patent: Jan. 29, 2008

(54) LINEAR ION TRAP FOR MASS SPECTROMETRY

(75) Inventors: Andrew N. Krutchinsky, San Francisco, CA (US); Herbert Cohen, New York, NY (US); Brian T. Chait, New York, NY (US)

(73) Assignee: The Rockefeller University, New York, NY (US)

( * ) Notice: Subject to any disclaimer, the term of this patent is extended or adjusted under 35 U.S.C. 154(b) by 371 days.

(21) Appl. No.: 11/216,459

(22) Filed: Aug. 31, 2005

(65) Prior Publication Data

US 2007/0045533 A1 Mar. 1, 2007

(51) Int. Cl.
*B01D 59/44* (2006.01)
*H01J 49/00* (2006.01)

(52) U.S. Cl. ...................... 250/290; 250/292; 250/288; 250/281; 250/282

(58) Field of Classification Search ..................... None
See application file for complete search history.

(56) References Cited

U.S. PATENT DOCUMENTS

| | | | |
|---|---|---|---|
| 5,420,425 A | 5/1995 | Bier et al. |
| 5,576,540 A | 11/1996 | Jolliffe |
| 6,177,668 B1 | 1/2001 | Hager |
| 6,504,148 B1 | 1/2003 | Hager |
| 6,617,577 B2 | 9/2003 | Krutchinsky et al. |
| 6,703,607 B2 | 3/2004 | Stott et al. |
| 6,809,318 B2 | 10/2004 | Krutchinsky et al. |
| 2004/0011956 A1 | 1/2004 | Londry et al. |
| 2004/0026613 A1 | 2/2004 | Bateman et al. |
| 2004/0222369 A1 | 11/2004 | Makarov et al. |

OTHER PUBLICATIONS

Hager, J., "A New Linear Ion Trap Mass Spectrometer," *Rapid Commun. Mass Spectrom.*, vol. 16, pp. 512-526 (2002).

Schwartz, J., et al., "A Two-Dimensional Quadrupole.Ion Trap Mass Spectrometer," *J. Am. Soc. Mass Spectrom*, vol. 13, pp. 659-669 (2002).

Stafford, Jr., G., "Ion Trap Mass Spectrometry: A Personal Perspective," *J. Am. Soc. Mass Spectrom*. vol. 13, pp. 589-596 (2002).

*Primary Examiner*—Jack I. Berman
*Assistant Examiner*—Zia R. Hashmi
(74) *Attorney, Agent, or Firm*—Hoffmann & Baron, LLP; Irving N. Feit

(57) ABSTRACT

A method for manipulating ions in an ion trap includes storing ions, spatially compressing, and ejecting selected ions according to mass-to-charge ratio. An ion trap includes an injection port, an arm having a first and a second end for confining and spatially compressing the ions, and an ejection port for ejecting the ions from the second end. The arm includes two pairs of opposing electrodes, which provide a quadrupole electric field potential at any cross-section of the ion trap. The distance between opposing electrodes and the cross-sectional area of the electrodes increases from the first to second end. The electrodes may be tapered cylindrical rods or of hyperbolic cross-section. Ions selected for ejection are spatially compressed into a region at the second (wider) end. The ion trap may include one arm, with either orthogonal or axial ejection, or two arms with a central insert for orthogonal ejection.

38 Claims, 11 Drawing Sheets

M=1000, 1000 ions, He pressure 50 m Torr

LINEAR ION TRAP FOR MASS SPECTROMETRY

GOVERNMENTAL SUPPORT

The research leading to the present invention was supported, at least in part, by NIH Grant No. RR 00862. Accordingly, the United States Government has certain rights in the invention.

BACKGROUND OF THE INVENTION

The present invention relates to ion traps for mass spectrometry, and in particular, to a linear ion trap device for efficient storage of ions providing high sensitivity, rapid, high efficiency mass spectrometry.

Ion trap mass spectrometers have conventionally operated with a three-dimensional (3D) quadrupole field formed, for example, using a ring electrode and two end caps. In this configuration, the minimum of the potential energy well created by the radio-frequency (RF) field distribution is positioned in the center of the ring. Because the kinetic energy of ions injected into an ion trap decreases in collisions with buffer gas molecules, usually helium, the injected ions naturally localize at the minimum of the potential well. As has been shown using laser tomography imaging, the ions in these conventionally constructed ion traps congregate in a substantially spherical distribution, which is typically smaller than about 1 millimeter in diameter. The result is a degradation of performance of the device due to space charge effects, especially when attempting to trap large numbers of ions.

As one possible solution to this problem, quadrupole mass spectrometers having a two-dimensional quadrupole electric field were introduced in order to expand the ion storage area from a small sphere into a beam. An example of this type of spectrometer is provided in U.S. Pat. No. 5,420,425 to Bier, et al. The Bier, et al. patent discloses a substantially quadrupole ion trap mass spectrometer with an enlarged or elongated ion occupied volume. The ion trap has a space charge limit that is proportional to the length of the device. After collision relaxation, ions occupy an extended region coinciding with the axis of the device. The Bier, et al. patent discloses a two-dimensional ion trap, which can be straight, or of a circular or curved shape, and also an ellipsoidal three-dimensional ion trap with increased ion trapping capacity. Ions are mass-selectively ejected from the ion trap through an elongated aperture corresponding to the elongated storage area.

Though increased ion storage volume is provided by the ion trap geometry of the Bier, et al. patent, the efficiency and versatility of the mass spectrometer suffer, for example, due to the elongated slit and subsequent focusing of the ions required after ejection. In addition, the storage volume is limited by practical considerations, since the length of the spectrometer must be increased in order to increase the ion storage volume.

There is a need, therefore, unmet by the prior art, to provide an efficient and compact ion trap, particularly for use in a mass spectrometer, which provides both good ion storage volume and efficient ejection of selected ions.

SUMMARY OF THE INVENTION

The present invention provides an efficient and compact ion trap and a method for manipulating ions in an ion trap. The ion trap and method provide both good ion storage volume and efficient ejection of selected ions. A high resolution, high sensitivity mass spectrometer that includes the ion trap is also provided.

In particular, the present invention provides a method for manipulating ions in an ion trap, which includes storing ions in the ion trap; spatially compressing the ions in a mass-to-charge ratio dependent manner; and ejecting the spatially compressed ions in a defined range of mass-to-charge ratios.

The method may include ejecting the ions orthogonally to an axis of the ion trap. Alternatively, the ions may be ejected axially, i.e., parallel to the injection path.

An ion trap of the present invention includes an injection port for introducing ions into the ion trap, an arm having a first end and a second end for confining and spatially compressing the ions, and an ejection port for ejecting the spatially compressed ions from the second end of the arm of the ion trap. The arm includes two pairs of opposing electrodes between the first end and the second end. Each electrode includes an interior surface suitably shaped for providing a quadrupole electric field potential at any cross-section of the ion trap. In addition, the distance between each opposing electrode increases from the first end to the second end. Ions selected for ejection are spatially compressed into a region at the second end.

The present invention also provides an ion trap including two pairs of opposing electrodes, where each pair is separated by a distance equal to twice an effective radius R of an electric field potential U(x,y,z), and a length L, which is measured along the z-axis. The two pairs of opposing electrodes are shaped to create an electric field potential described by an equation (1) as follows:

$$U(x,y,z)=U_0\left(\frac{x^2-y^2}{R^2}\right)+C, \qquad (1)$$

and the effective radius R varies as a function of a variable length z according to $$R=\frac{r_0}{\sqrt{1+kz/L}}, \qquad (2)$$

where k, C, $r_0$ and $U_0$ are constants dimensioned to satisfy the equation (1) of the electric field potential for the chosen boundary condition.

The present invention additionally provides an ion trap including an injection port for introducing ions into the ion trap, a length L along which injected ions are stored, which is measured along a z-axis, and an arm including two pairs of opposing electrodes extending the length L and suitably shaped to confine the injected ions. Each pair of opposing electrodes is separated by a distance 2R, wherein R varies as a function of the variable z. The two pairs of opposing electrodes include a larger or wider end, and a smaller (narrower) end. Ions selected for ejection are compressed toward the larger end. The ion trap also includes an ejection port for ejecting the selected ions from the larger end.

The electrodes of the ion trap of the present invention may include a hyperbolic cross-sectional shape, with a cross-sectional area that increases from the narrower to the wider end.

Alternatively, the electrodes may include tapered rods, which have a circular cross-sectional shape. Preferably, these tapered rods have a circular cross-section of diameter D at each value 2R along the length, which satisfies the equation:

$$D=1.148\times 2R \quad (4).$$

As a result, the present invention provides an efficient and compact ion trap and a method for manipulating ions in an ion trap, which provide both increased ion storage volume and efficient ejection of selected ions. The ion trap may be adapted for use in a high resolution, high sensitivity mass spectrometer.

Other objects and features of the present invention will become apparent from the following detailed description considered in conjunction with the accompanying drawings. It is to be understood, however, that the drawings are designed as an illustration only and not as a definition of the limits of the invention.

DESCRIPTION OF THE PREFERRED EMBODIMENTS

Figure 1:
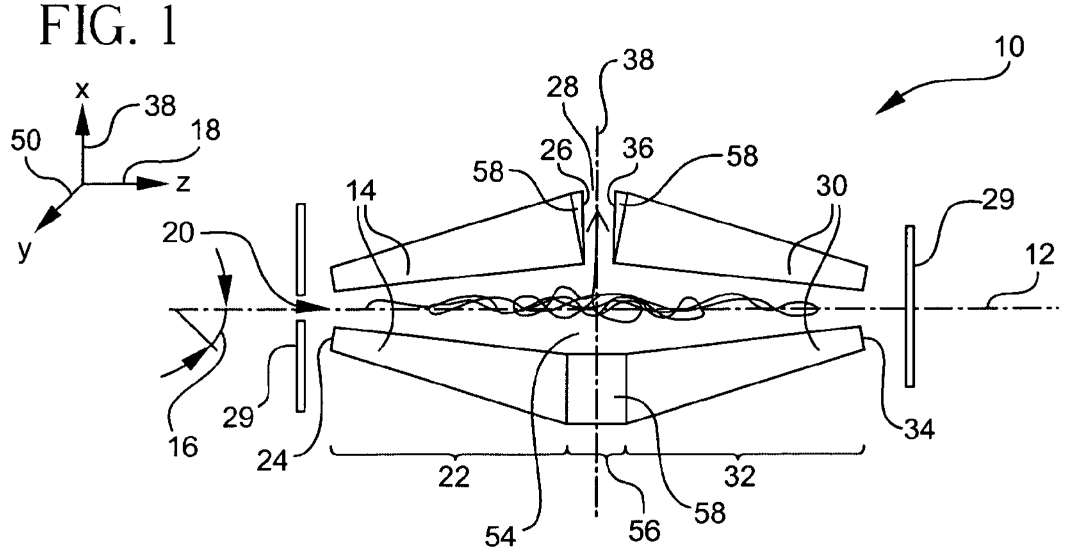
FIG. 1 is a schematic representation of a cross-section of an embodiment of an ion trap formed in accordance with the present invention. For simplicity, only one of the two pairs of opposing electrodes is shown.

Referring to FIG. 1, an ion trap 10 and a method for manipulating ions in an ion trap 10 are provided. The method includes storing ions preferably along a length of an axis 12 of the ion trap 10. The method also includes efficient ejection of selected ions by spatially compressing the ions into a region of the ion trap 10 in a mass-to-charge ratio dependent manner before ejection.

The ion trap 10 of the present invention provides ion storage of high capacity. The ion trap 10 also allows all stored ions to be sequentially ejected by compressing them according to their mass-to-charge value, also called the m/z value. Therefore, in one ejection scan, a mass spectrometer including the ion trap 10 (see FIG. 2, e.g.) can obtain structural information concerning the molecules from which the ions are formed. A typical scan may last just a few seconds.

The ion trap 10 of the present invention includes a set of two pairs of opposing electrodes 14 (one pair is shown in FIG. 1), which are positioned at an angle 16 with respect to the z-axis 18.

The four-electrode structure allows a radio frequency (RF) quadrupole field to be established, which traps the ions in the radial dimension. The RF field is generated according to methods well-known to those skilled in the art, including the application of static direct-current (DC) potentials applied to the ends of the electrodes 14.

The z-axis 18 is also referred to as the axis of the ion trap 10, and refers to the axis along which ions are stored. The length of the ion trap is measured along the axis or z-axis 18.

Ions are injected into the ion trap 10 via an injection port 20. The two pairs of opposing electrodes 14 together form an arm 22 of the ion trap 10 for confining the injected ions between the electrodes 14. The arm 22 preferably includes a first end 24 and a second end 26. As shown in FIG. 1, the distance between opposing electrodes increases from the first end 24 toward the second end 26, as a result of the angular 16 displacement of each electrode from the axis of symmetry 12 of the arm 22. This geometry allows a stronger electric field to be generated between the electrodes at the first end 24 compared with that of the second end 26. The resultant electric field gradient is used to squeeze selected ions toward the second end 26 during the ejection process. The selected ions are thus spatially compressed into a region at the second end 26 and then ejected through an appropriately positioned ejection port 28.

The ion trap 10 also preferably includes stopping plates 29 at each end, to which small DC stopping potentials are applied in order to prevent ions from escaping along the z-axis 18.

In a preferred embodiment shown in FIG. 1, the ion trap 10 also includes a second set of two pairs of opposing electrodes 30 forming a second arm 32. The second arm 32 also has a first end 34 and a second end 36, and a distance between opposing electrodes 30 which increases from the first end 34 toward the second end 36. The ion trap 10 is housed in a vacuum chamber 37 to which gas is introduced to maintain an appropriate pressure. The two sets of four-electrodes face each other at their wider ends, so that second end 26 faces second end 36. Preferably, the second set 30 mirror the first set 14 about, for example, a vertical or x-axis 38.

Figure 2:
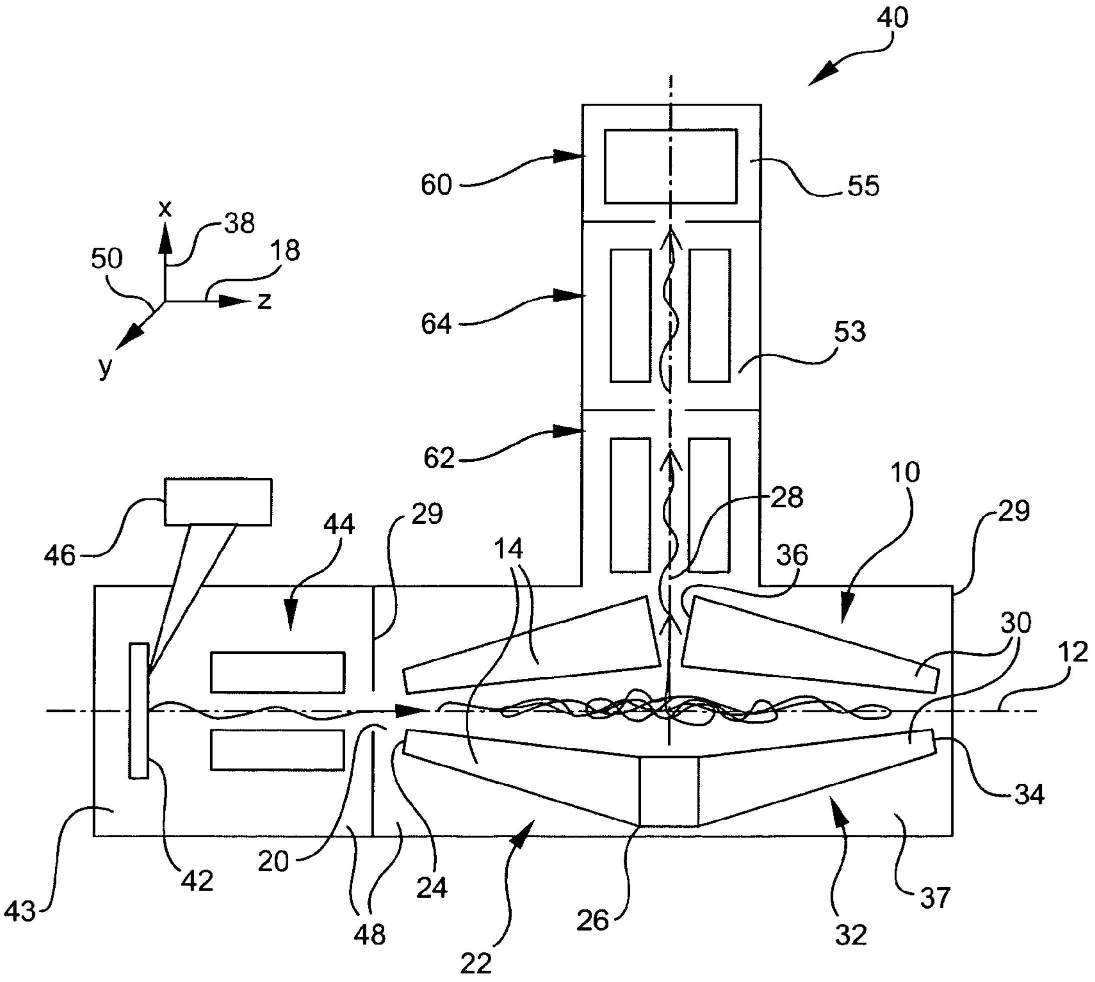
FIG. 2 is a schematic representation of a cross-section of an embodiment of a mass spectrometer of the present invention, which includes the ion trap of FIG. 1.

An ion trap mass spectrometer 40 formed according to the present invention includes the ion trap 10. As shown in FIG. 2, the spectrometer 40 of the present invention also preferably includes a source of ions 42, and preferably, an ion guide 44 housed in its own vacuum chamber 45, which is maintained at an appropriate pressure as known to those skilled in the art. It will be recognized by those skilled in the art that any source of ions may be used to generate ions for injection, including, for example, a matrix-assisted laser desorption/ionization (MALDI) target irradiated by a laser 46, or by electrospray ionization ion source. The ion guide 44 may include a typical quadrupole in a four-rod parallel electrode configuration or any other means known to those skilled in the art for guiding ions.

Preferably, the spectrometer 40 further includes a buffer gas, such as Helium, which fills the interior 48 of the spectrometer 40 for cooling of the ions by collisions with molecules or atoms of the buffer gas 48 before and after injection into the ion trap 10.

Referring to FIGS. 1-2, in operation, the ion trap 10 of the present invention as used in the spectrometer 40, for example, accumulates ions over some time interval, using an appropriate RF signal with constant amplitude applied to both sets of electrodes 14 and 30.

The electrodes in each arm of the ion trap 10 of the present invention are preferably tapered and suitably shaped to provide a quadrupole electric field potential at any cross-section of the ion trap 10. In particular, the geometry of the ion trap and shape and placement of the pair of opposing electrodes in each arm preferably provide a three-dimensional electric field potential U(x, y, z), which can be described by the equation:

$$U(x, y, z) = U_o\left[\frac{x^2 - y^2}{R^2}\right] + C. \tag{1}$$

The parameter R represents an effective radius of the field potential, and corresponds to half of the distance separating a pair of opposing electrodes in an arm at any cross-section of the ion trap 10. R varies as a function of a variable length z along the z-axis 18, measured from the first end 24, according to the following:

$$R = \frac{r_0}{\sqrt{1 + kz/L}}. \tag{2}$$

The variables x and y in equation (1) correspond to coordinates on the x-axis 38 and y-axis 50 respectively, where the z-axis 18 of the coordinate system coincides with the centered axis 12 of the trap 10. The origin of the coordinate system is centered, therefore, on the axis of symmetry 12 between opposing electrodes at the narrowest end of the arm, e.g., at the first end 24. L corresponds to the length of the arm from the first end 24 to the second end 26, for example. The parameters k, $U_0$ and C in equations (1) and (2), represent constants, which are determined according to chosen boundary conditions for a given value of $r_0$. Looking at the left arm 22 of the ion trap 10 in FIG. 1, $r_0$ physically corresponds to half of the distance between opposing electrodes 14 at z=0, i.e., at first end 24.

One skilled in the art will recognize that the angle 16 of the electrodes with respect to the z-axis 18 is related to the parameter k. It can be seen, for example, that the tangent of the angle 16 equals $$\frac{R_{MAX} - r_0}{L},$$

where $R_{MAX}$ is the value of R in equation (2) evaluated at z=L. In addition, by substitution into equation (2), $$R_{MAX}(z) = \frac{r_0}{\sqrt{1 + k}}$$

for z=L. In general, however, the value of k will be determined by the chosen shape of the rods, which also contributes to a proper choice of angular deviation 16, and the length L of the arm.

The angular deviation 16 is non-zero and preferably, substantially large enough given the geometry of the electrodes and length of the ion trap to spatially compress ions into a region in the widest end, e.g., a second end 26, of the ion trap 10.

In one embodiment, the angular deviation 16 is greater than 0 degrees.

In another embodiment, the angular deviation 16 is greater than 0 degrees and less than 90 degrees.

In yet another embodiment, the angular deviation 16 is greater than 10 degrees.

In still another embodiment, the angular deviation 16 is less than 45 degrees.

Figure 3:
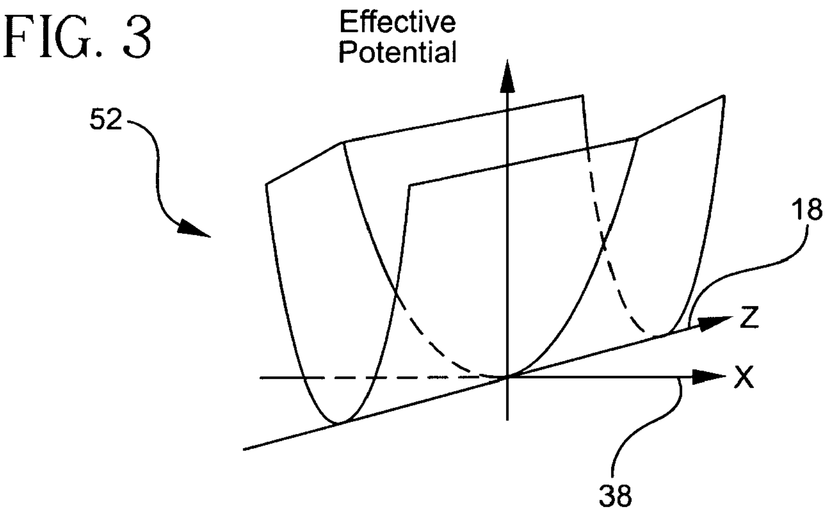
FIG. 3 is a three-dimensional plot of an embodiment of an effective electric potential well formed by the ion trap of FIG. 1.

FIG. 3 illustrates an example of the effective trapping potential 52 represented by equations (1) and (2), which is created in one arm of the ion trap 10 once an RF voltage is applied to the electrodes.

The effect of the trapping potential 52 described by equation (1) can be described as follows. Ions entering the ion trap 10, preferably filled with collision gas (such as, for example He or N2), will have a tendency to accumulate along the z-axis 18 of the device 10. As ions collide with molecules of a neutral buffer gas they lose their kinetic energy. At the same time, ions are efficiently confined inside of the device 10 by the RF field created by the quadrupole rods 14 and by the small repelling DC field created by end plates to which a stopping potential is applied. Ions which do not align along the z-axis 18 (ions with excess of kinetic energy) will be influenced by a force arising due to an effective potential which pushes ions towards the wider end of a quadrupole. Eventually, after ions lose enough kinetic energy in collisions with the buffer gas, they will distribute themselves along the z-axis 18 of the entire ion trap. The force along the z-coordinate is negligibly small at small distances from the z-axis.

Ejection of stored ions from the ion trap 10 of the present invention is then preferably achieved by applying an additional small excitation RF signal between opposing pairs of electrodes, and simultaneously ramping up the amplitude of the applied excitation RF voltage. Due to the shape of the electric field potential described by equations (1) and (2) and depicted in FIG. 3, this results in the ions with the smallest m/z values and closest to the injection port 20 of the ion trap 10 to get excited first. The increasing amplitude of RF voltage causes instability of ion motion in the trap 10. As the amplitude of ion oscillation around the z-axis increases, so does the force pushing ions toward the wide end or second end 26, for example. The ions of this particular m/z value are thus quickly "squeezed" or spatially compressed towards a region 54 near the wide ends of each arm of the trap 10. As described above, this region 54 has a smaller electrical field density than the narrower end(s), first end 24, for example, of the trap 10.

The m/z-dependent compressing of ions essentially decouples the processes of ion storage and ion ejection. While ions are being stored, ions may occupy the entire cylindrical volume of the ion trap 10 along its axis 12. During ejection, ions are selectively compressed according to their m/z ratio into the region 54 at the widest part of ion trap 10, which corresponds to the second ends 26 and 36 of the ion trap 10 of FIG. 1.

Controlled ion ejection then occurs from the ejection port 28, when the amplitude of the RF oscillations becomes comparable with the distance between opposing electrodes, resulting in the ions reaching a so-called ejection energy threshold, as is known to those skilled in the art.

Referring again to FIG. 2, a controlled pressure differential is preferably maintained in the spectrometer 40 between the ion source chamber 43, and the analyzer in a detector chamber 55, by any means known to those skilled in the art, such as differential pumping. This pressure differential allows the injected ions to easily transition from the high-pressure ion source region 43 to the desirable low-pressure region 55.

As those skilled in the art will recognize, the ion source chamber 43 is typically maintained at a pressure between about 10 and 1000 millitorr and the detector chamber 55 pressure is typically maintained within a range of about $10^{-7}$ to $10^{-4}$ torr. The ion trap chamber 37 is preferably maintained at about 0.3 to 200 millitorr, and an additional chamber 53 positioned between the ion trap 10 and the detector chamber 55 is preferably maintained at about $10^{-7}$ to $10^{-4}$ torr.

In the preferred embodiment of the ion trap 10 of FIG. 1, a central insert 56 is also included, which preferably has two pairs of opposing electrodes 58, which are substantially parallel. Arm 22 and arm 32 of the ion trap are preferably operatively connected to either side of the central insert 56. One of the electrodes 58 includes an aperture, which forms the ejection port 28.

In one embodiment, the central insert 56 includes a small conventional linear quadrupole having a four parallel-rod configuration. FIG. 2A of U.S. Pat. No. 5,420,425 to Bier, et al., provides an example of a quadrupole that may be used as the central insert 56.

In another embodiment of the central insert 56, the ejection port 28 is provided by omitting one of the electrodes (top electrode 58 in FIG. 1). In other words, in this embodiment, the central insert 56 includes one pair of opposing parallel electrodes which are each operatively connected on either side to an electrode in each arm, and a third parallel electrode operatively connected to a third electrode in each arm.

In a further embodiment best shown in FIG. 2, the ejection port 28 may be tapered to simplify machining of the electrodes, with the ejected ions entering the narrower end and exiting the ion trap 10 at the wider end of the taper. The electrodes may also be machined to provide a cylindrical shaped ejection port 28 (see FIG. 8).

Referring to FIG. 2, the spectrometer 40 of the present invention preferably also includes a detector assembly 60 for detecting the ejected ions, and at least one ion guide 62 for guiding the ejected ions from the ejection port 28 to the detector assembly 60.

The ion guide 62 may include, for example, a set of two opposing pairs of substantially parallel electrodes forming a conventional quadrupole, to which a DC potential is applied in operation as is well-known to those skilled in the art.

In one embodiment, the spectrometer 40 includes the ion guide 62 including a quadrupole, which is used as a collision cell, and an additional four-electrode structure 64, which is used as a mass filter between the collision cell and the detector 60. In this embodiment, the efficiency of a selected ion monitoring scan or a neutral loss scan experiment will be greatly increased over conventional mass spectrometers.

In a further embodiment, the mass spectrometer 40 includes the ion guide 62 including a quadrupole followed by an orthogonal injection time-of-flight mass spectrometer. This embodiment of the spectrometer of the present invention is theoretically capable of performing full-range tandem mass spectrometry without loss of signal, referred to as "MS/MS," on every ion in the single-stage mass spectrum in order to generate complete structural information for the compound ions of interest.

The present invention, therefore, provides an ion trap which, when used in a spectrometer, enables multiplexing of an MS/MS experiment by sequentially carrying out MS/MS on each ion species ejected from the ion trap in the whole M/Z range of interest without losses. Theoretically, the gain in sensitivity approaches $(\Delta M/Z)/(\Delta m/z)$. $\Delta M/Z$ refers to the observable m/z range of the mass spectrometer and is typically on the order of about 4000. $\Delta m/z$ refers to a resolution of the mass spectrometer and is typically in a range of about 14-40. Therefore, theoretical gains from 100 to 1000 times may be achieved with a mass spectrometer that includes the ion trap of the present invention. As a result of this sensitivity increase, a significant gain in speed of the measurements is also provided.

In one embodiment, $\Delta M/Z$ for a spectrometer formed in accordance with the present invention is at least 100.

In another embodiment, $\Delta M/Z$ for a spectrometer formed in accordance with the present invention is about 100,000 or less.

In one embodiment, $\Delta m/z$ for a spectrometer formed in accordance with the present invention is at least 1.

In another embodiment, $\Delta m/z$ for a spectrometer formed in accordance with the present invention is about 100 or less.

The increased improvement in performance of an ion trap 10 and spectrometer formed in accordance to the present invention is a result of the novel geometry of the electrodes in each arm, which provides a unique electric field potential that selectively and sequentially compresses ions according to their m/z ratios into a region near the ejection port.

As best described by equation (1), the ion trap 10 of the present invention is essentially a three-dimensional ion trap. Equation (1) was derived from the following equation:

$$U(x, y, z) = U_0\left(\frac{x^2 - y^2}{r_0^2}\right) \times (1 + kz/L) + C, \tag{3}$$

where $U_0$, $r_0$, L, k, and C are some constants as described above, and x, y, z are coordinates.

The concrete values for the constants are preferably set from a particular boundary condition, as well-known to those skilled in the art, for which x and y coordinates are set to correspond to $r_0$, i.e., for $x^2+y^2=r_0^2$, and z is set to the particular length of a device L.

The potential U(x,y,z) described by equations (1) and (3) satisfy a Laplace ($\Delta U=0$) equation. The first term in the brackets of equation (3) resembles the potential of a two-dimensional quadrupole, which is in turn multiplied by another term that introduces the dependence of the entire potential on the z-coordinate. This similarity to the two-dimensional quadrupole potential is emphasized by rewriting equation (3) in the form of equation (1):

$$U = U_0\frac{x^2 - y^2}{R^2} + C, \tag{1}$$

and by defining the variable R according to equation (2) as:

$$R = \frac{r_0}{\sqrt{1 + kz/L}}. \tag{2}$$

In this form, equation (1) resembles even more an equation for a linear quadrupole, and emphasizes an essential difference. The distance between opposite electrodes, corresponding to 2R, changes as a function of the z-coordinate.

Figure 4:
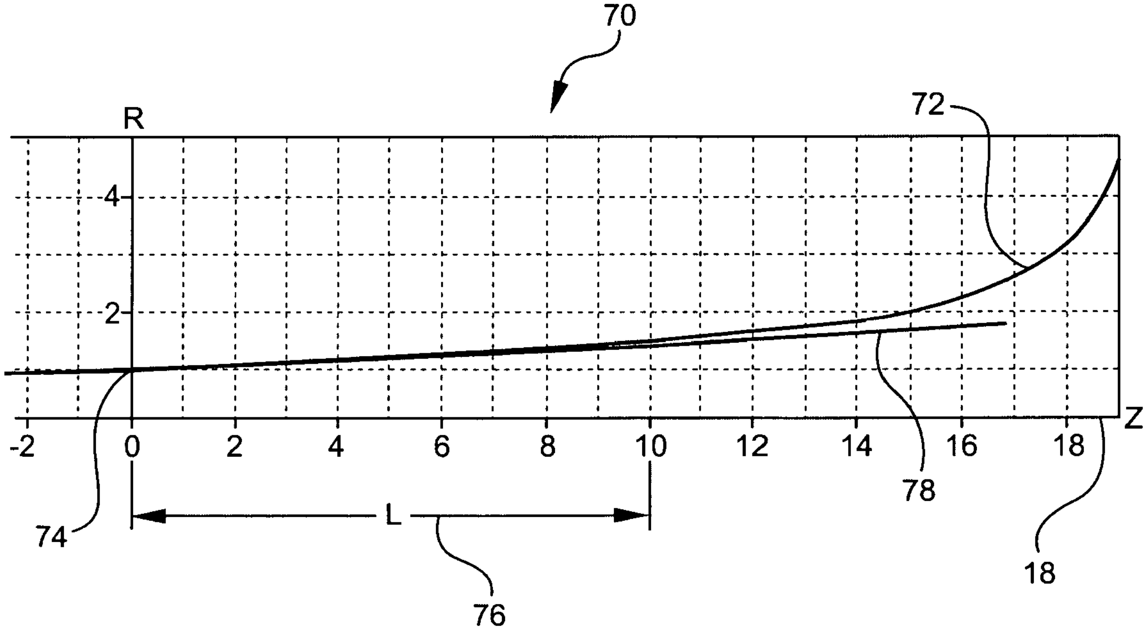
FIG. 4 is a plot of a radial distance of one of the electrodes in an arm of one embodiment of the ion trap of FIG. 1 from the z-axis as a function of z, when the value of $r_0$ is set to 1, the value of k is set to −0.5, C is set to 0 and the value of L is set to 10. A linear approximation is also plotted.

As an example, the graph 70 in FIG. 4 plots the distance R 72 from the z-axis 18, which corresponds to half the distance between opposing electrodes, as a function of distance from the first (narrow) end. In this example, the value of $r_0$ 74 is set to 1, the value of k is set to −0.5, C is set to 0 and the value of L 76 is set to 10. A linear approximation 78 is also plotted, showing that R varies approximately linearly, at least in the range of z=0 to z=10 corresponding to the length L 76 of the arm. This good linear fit within the length of the arm indicates that the electrodes of the linear ion trap 10 can be advantageously machined without great difficulty.

Figure 5:
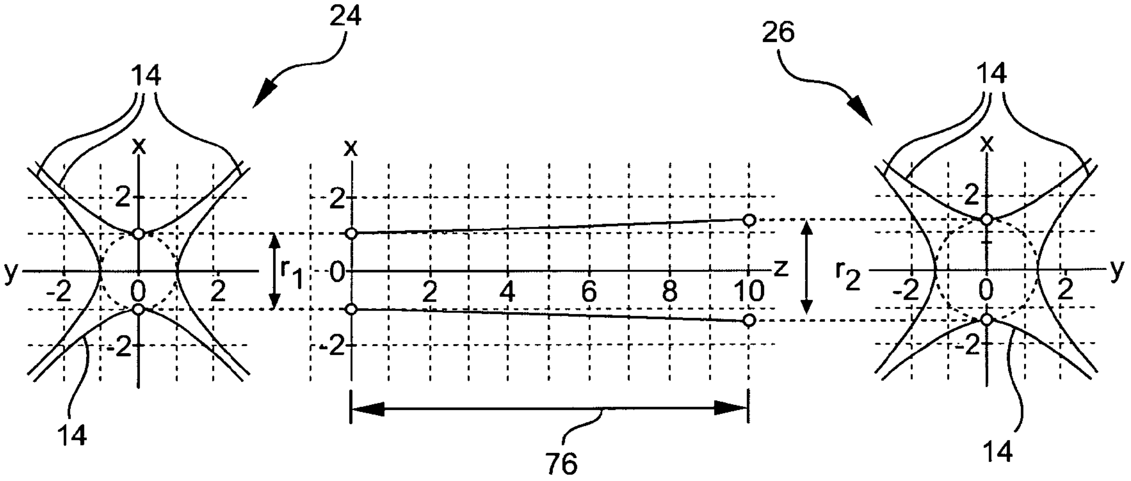
FIG. 5 is a plot of the radial distance of an opposing pair of electrodes for the embodiment of FIG. 4. The plot shows how the shape of the electrodes and the distance between them change from one end to the other.

FIG. 5 shows the distance between a pair (top and bottom) of opposing electrodes 14 at the first end 24 and the second end 26 (see FIG. 1) of the electrodes for the same values of the constants $r_0$, k, C, and L used to plot FIG. 4. At the first end 24, R corresponds to $r_0$ which equals 1. At the second end 26, R equals about 1.5.

As a result of the tilting angle 16 of the electrodes in the present invention, the shape of the electrode cross-section and the taper, and, consequently, the cross-sectional area of each electrode as a function of z are important. In addition, the optimum taper and shape will depend on the tilting angle 16.

Essentially, the electrodes of the present invention include any shape and arrangement thereof, which can provide a substantially quadrupole potential at any cross-section of the ion trap and thus substantially satisfy equations (1) and (2).

Figure 6A:
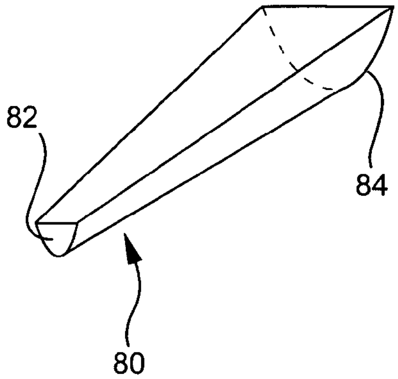
FIG. 6A is a perspective view of an electrode having a hyperbolic cross-section, which has a cross-sectional area that increases from a first to a second end, according to an embodiment of the ion trap of the present invention. The acuteness or eccentricity of the hyperbolic shape likewise decreases from the first to second end.

In one embodiment, an electrode 80 for use in the ion trap 10, as shown in FIG. 6A, has a cross-section in the shape of a hyperbola. The hyperbolic profile is best seen at an end 82 of the electrode corresponding to the first end 24, for example, of an arm of the ion trap 10 (see FIG. 1). The electrode 80 is tapered, so that the cross-sectional area of each electrode increases from the first end 82 to the second end 84 of the electrode 80.

Figure 6B:
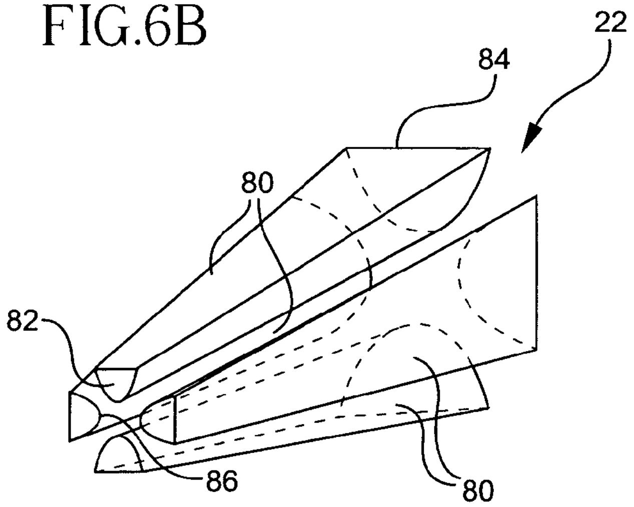
FIG. 6B is a perspective view of two opposing pairs of the electrode of FIG. 6A forming an arm of the ion trap.

Referring to FIG. 6B as well as to FIG. 1, an arrangement of two pairs of opposing electrodes of hyperbolic cross-section 80 in an arm 22, for example, of the ion trap 10 is shown. The electrodes 80 are arranged so that the interior surface 86 of each opposing electrode 80 includes an inwardly curved profile, as shown, each opposing pair arranged as a mirror image around the center (z-) axis 12.

In addition, the acuteness or slope of the curve (also referred to herein as eccentricity) at a mid-point of the hyperbolic profile of each electrode 80 preferably decreases from the first end 24 to the second end 26 of the arm 22, in order to maintain the hyperbolic profile and substantially quadrupole potential at each cross-section as the distance between opposing electrodes is increased. The electrodes 80 are thus oriented and shaped to substantially maintain the electric trapping potential described by equation (1).

Figure 7A:
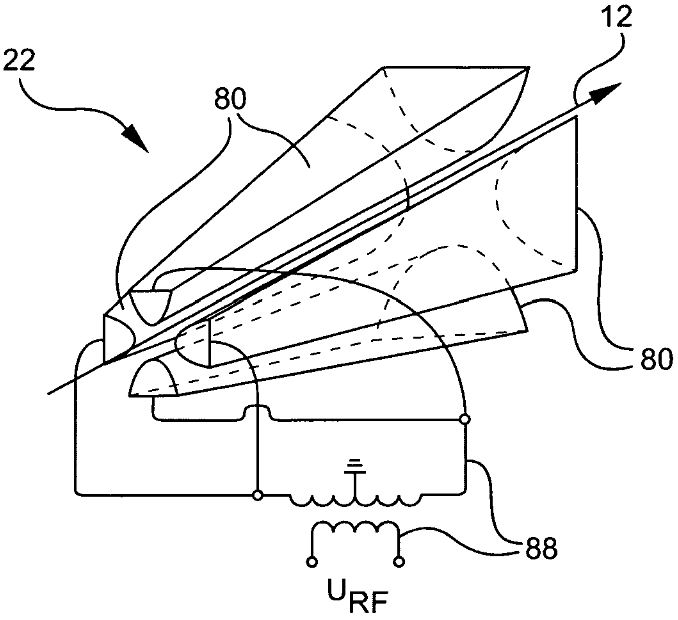
FIG. 7A is a schematic representation of the arm of FIG. 6B with a radio frequency (RF) voltage applied.

As shown in FIG. 7A, therefore, when a voltage supply 88 is used to apply RF voltages to the electrodes 80 shaped as described in FIG. 6A and arranged to form an arm 22 as in FIG. 6B, an effective potential for trapping ions is formed.

Figure 7B:
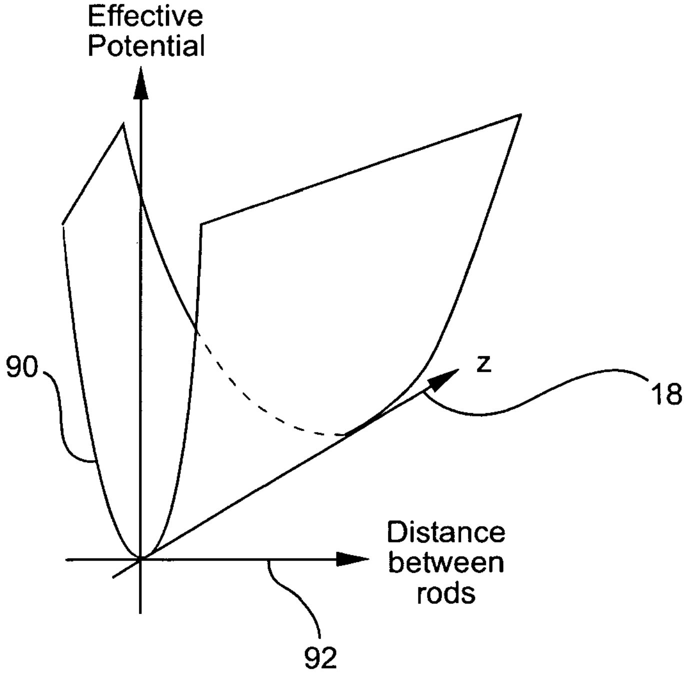
FIG. 7B is a graphical representation of the effective potential formed when the RF voltage is applied according to FIG. 7A. The potential is plotted as a function of z and a distance 2R between a pair of opposing electrodes.

A representation of the shape of the effective potential 90 formed according to FIG. 7A is shown in FIG. 7B. The potential 90 is plotted as a function of z 18 and a distance (2R) 92 between a pair of opposing electrodes 80. This effective potential 90 creates a steep hyperbolic well at the injection port 20 and first end 24 of the ion trap 10, which gradually becomes shallow at the other end 26.

Simulations of ion motion in the trap 10 constructed from two arms 22 and 32 connected by the central insert 56 as shown in FIG. 1 have been performed. In addition, experimental mass spectrometry measurements have been collected. For the simulations, it was assumed that the electrodes 80 were of hyperbolic cross-section in the configuration of FIG. 6B, and that the central insert 56 included a four parallel-rod quadrupole as in the Bier, et al. patent.

Figure 8:
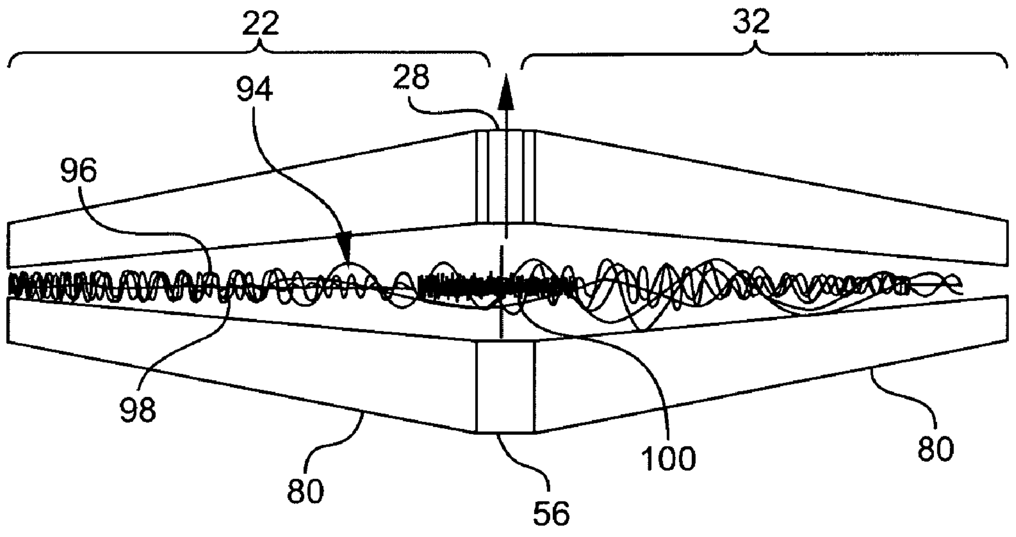
FIG. 8 is a cross-section of an embodiment of the ion trap of the present invention with a simulated projection of ion trajectories.

A typical ion trajectory 94 is shown for such a device in FIG. 8, drawn in two projections, one on the (x,z)-plane 96 and the other 98 on the (y,z)-plane.

Simulations were performed with ions with different m/z values. All simulations showed similar ion behavior in the trap 10. At first, ions have a tendency to spread along the entire length of the device. However, when the amplitude of the excitation RF voltage begins to ramp up and a small excitation voltage is applied between the two pairs of rods in each arm, the ions compress towards the center of the trap. Eventually ions having the same m/z values bunch in a region 100 at the central widest part of the trap for a few moments before being ejected.

Figure 9:
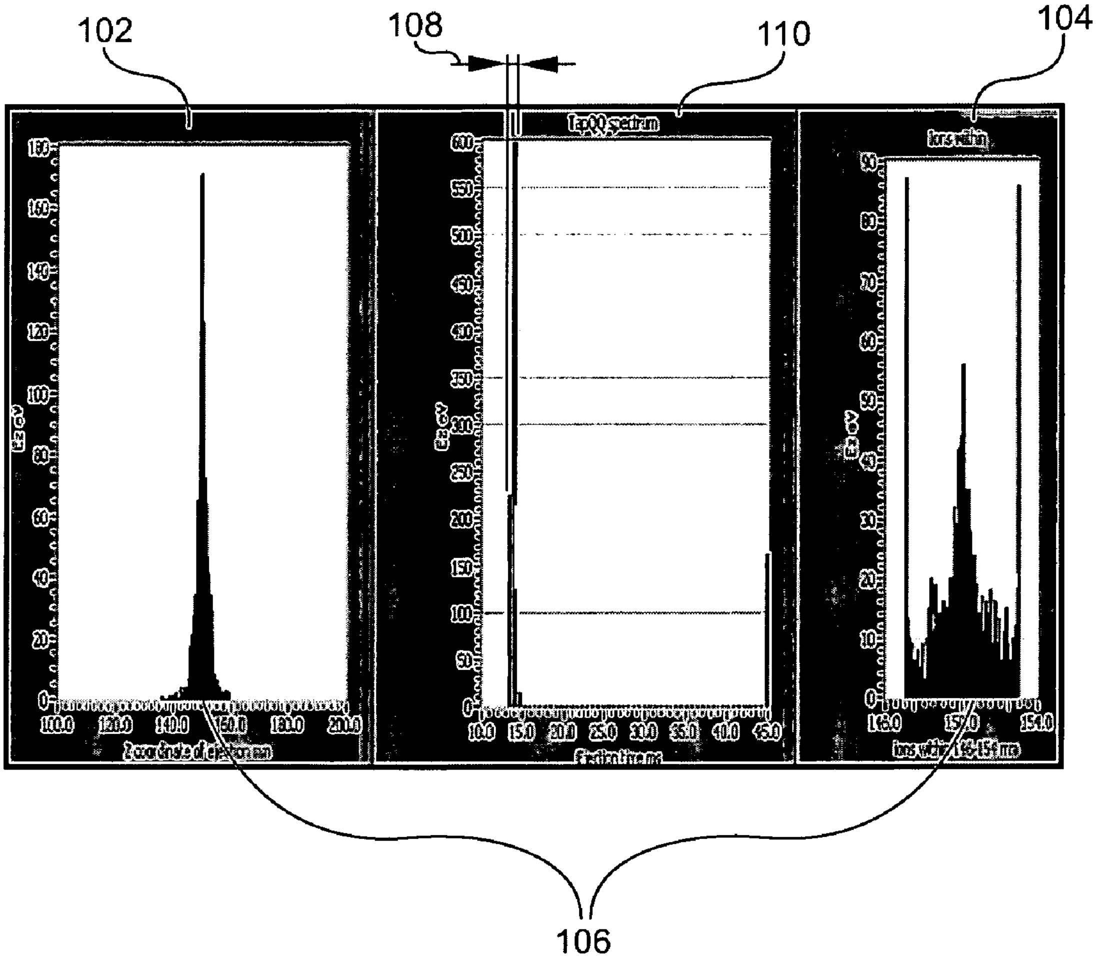
FIG. 9 is a representative plot of the results of a simulation of motion for 1000 ions with m/z=1000 in an ion trap of the present invention.

FIG. 9 shows the results of simulation of motion for 1000 ions with m/z=1000. The first 102 and the third panel 104 of the figure shows that the vast majority of ions are ejected at z=15 cm+−0.5 cm 106, which corresponds to a position of the ejection slit 28 at the center of the trap. The spectral width 108 of the ejected peak is about 1-1.5 msec, which is indicated on the second panel 110. All initial conditions for particular simulations are also shown in the figure.

Similar simulations were performed with ions of different m/z values. All simulations indicated stable behavior of the ion trap 10 formed in accordance with the present invention.

Figure 10A:
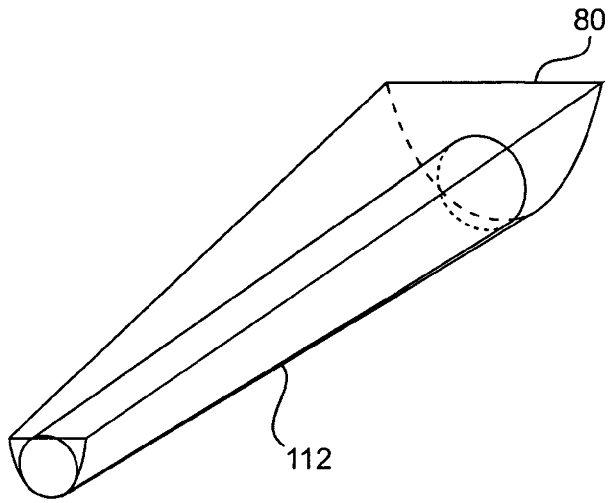
FIG. 10A is a perspective view of an electrode having a circular cross-section, and which is tapered, according to an embodiment of the ion trap of the present invention.
Figure 10B:
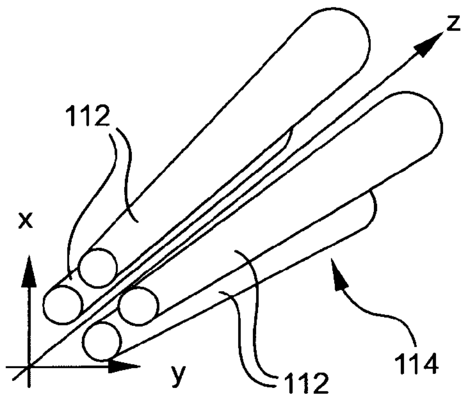
FIG. 10B is a perspective view of two opposing pairs of the electrode of FIG. 10A forming an arm of the ion trap.

In another embodiment of the present invention, the electrodes in each arm of the ion trap include cylindrical rods of circular cross-section. Referring to FIG. 10A, preferably, the rods are cylindrical tapered rods 112 (shown in the outline of a hyperbolic shaped rod 80, for comparison). It has been shown that such cylindrical tapered rods 112 may be used in the same four-electrode tilted angle configuration 114, as shown in FIG. 10B, in an arm of the ion trap of the present invention to substantially approximate a quadrupole field in any cross-section of the ion trap. Therefore, the cylindrical rods 112 used in an arm 22 for example of the ion trap 10 of FIG. 1 will also closely approximate the electric potential of equation (1).

Figure 11:
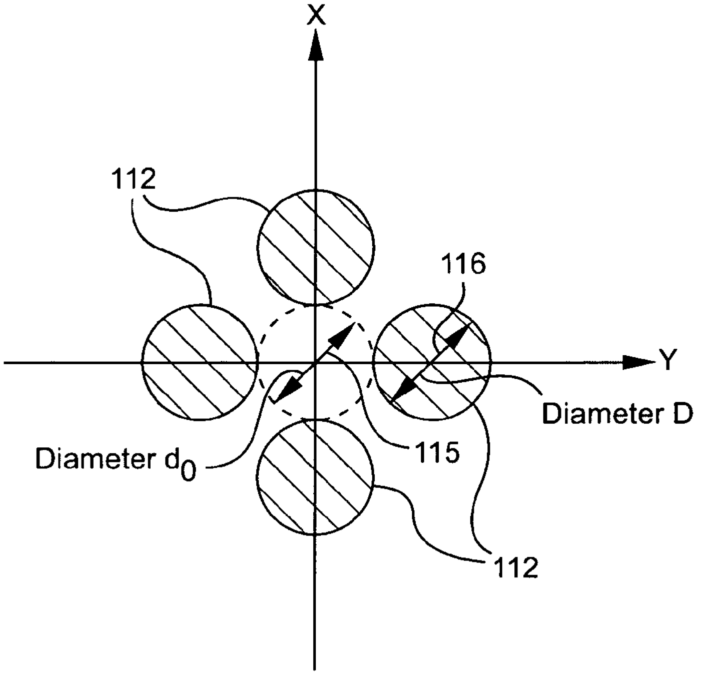
FIG. 11 is a cross-sectional view of the arm of FIG. 10B.

Referring to FIG. 11, most preferably, the taper of the rods 112 and distance $d_0$ 115 between them is chosen so that the circular cross-sectional diameter D 116 of a rod 112 equals the product of approximately 1.148 and the distance $d_0$ 115 in the (x,y)-plane taken at any z-coordinate, i.e., at every cross-section. In other words, the following condition is preferably satisfied for this embodiment:

$$D=1.148\times d_0 \quad (4),$$

where $d_0$ also equals 2R, and where R is defined by equation (2).

Figure 11A:
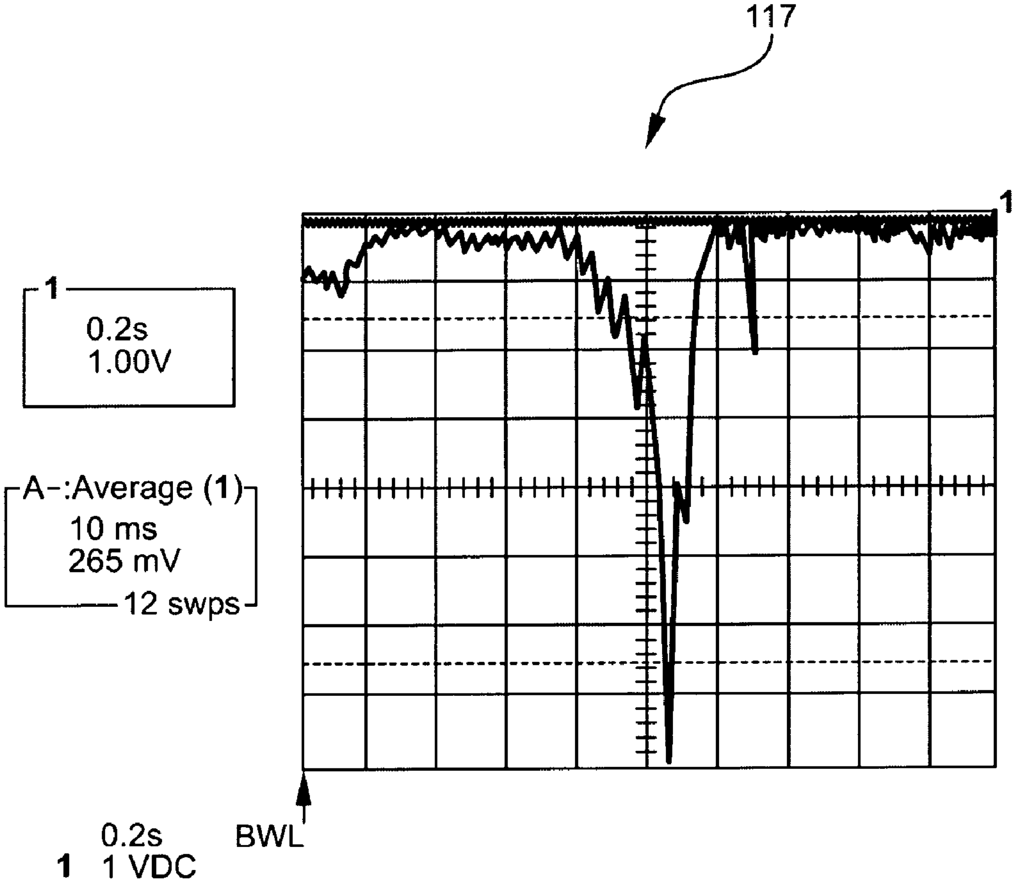
FIG. 11A is a spectrum of a peptide with m/z of 1533 obtained with amass spectrometer formed from the ion trap having the geometry of FIG. 1, where each arm includes the tapered rods as shown in FIG. 10B.

The ion trap 10 of FIG. 1, having the tapered rods 112 described by FIGS. 10A-11, has been built and tested in a mass spectrometer 40 of the present invention described by FIG. 2. FIG. 11A is an experimental spectrum 117 measured with the device 40, showing a resolution in measurement (ratio of atomic mass measured and resolvable atomic mass, or M/Δm) approximately equal to about 120-150. For the experimental scans, the amplitude of the RF voltage applied was 3.2 volts at an excitation frequency of about 281 kHz. The RF voltage was ramped up over a one second interval, and then the ions were accumulated for measurement over an additional one second interval. The pressure within the chamber 45 housing the ion source 42, a MALDI target irradiated by a laser 46, was maintained at about 85 millitorr, and the pressure within the chamber 37 housing the ion trap 10 was maintained at about 1 millitorr.

As described above, the electrodes of the present invention include any shape and arrangement of electrodes, which can provide a substantially quadrupole potential at any cross-section of the ion trap to substantially satisfy equations (1) and (2).

In another embodiment, the electrodes include a cross-section of at least a fraction of a circle, arranged so that the interior surface of each opposing electrode within the trap forms at least an arc of the circle. The circle is centered at a point external to the interior of the trap. The taper of the electrode and distance between opposing electrodes is chosen to optimally satisfy equations (1) and (2).

In yet another embodiment, a cross-section of each electrode defines a parabola. The interior surface of each opposing electrode includes an inwardly curved profile. Further, an acuteness of the parabola increases from the second end 26 toward the first end 24, for example in arm 22 of the ion trap 10 of FIG. 1.

Referring again to FIGS. 1-2, ions are ejected orthogonal to the axis 12 after being compressed toward the center widest region between the two arms. Furthermore, the ejection port 28 is orthogonal to the injection port 20 as provided in FIGS. 1-2.

In another embodiment, however, the injection port 20 and ejection port 36 may be parallel. In yet another embodiment, the injection port 20 and ejection port 28 coincide.

Figure 12:
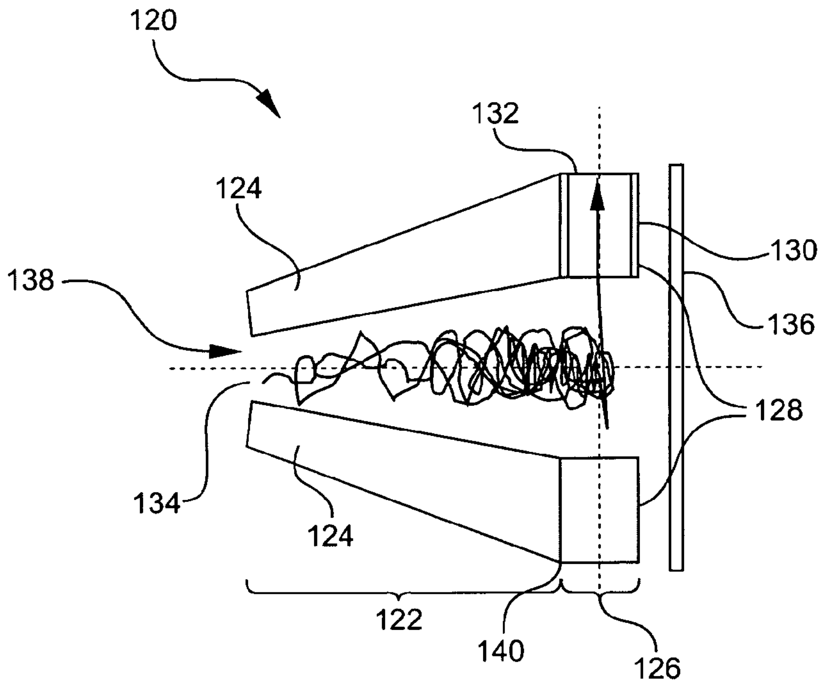
FIG. 12 is a schematic representation of a cross-section of another embodiment of an ion trap formed in accordance with the present invention.

Referring to FIG. 12, one embodiment of the ion trap 120 of the present invention includes only one arm 122 that includes two pairs of opposing electrodes 124. The ion trap 120 may also include an insert 126, preferably including two pairs of parallel opposing electrodes 128. One of the parallel electrodes 130 includes the ejection port 132, which is orthogonal to the injection port 134. The trap 120 further includes a stopping plate 136 to which a stopping potential is applied to contain the ions axially.

A simulation of the ion trajectories 138 after injection is provided in FIG. 12 showing the compression of the ions toward the wider end 140 and the central insert 126.

In one embodiment, the insert 126 includes a small linear conventional quadrupole, such as the Bier, et al. quadrupole of FIG. 2A.

Figure 13:
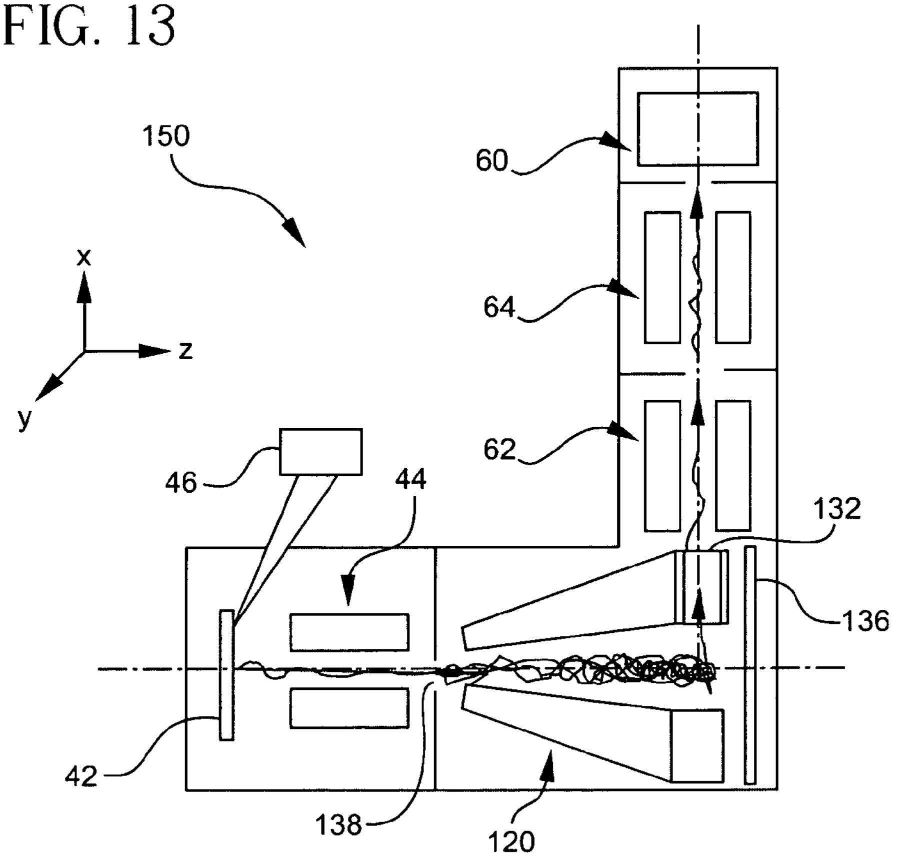
FIG. 13 is a schematic representation of a cross-section of another embodiment of a mass spectrometer of the present invention, which includes the ion trap of FIG. 12.

FIG. 13 shows the one-armed ion trap 120 with orthogonal ejection incorporated into a mass spectrometer 150 formed in accordance with the present invention.

Figure 14:
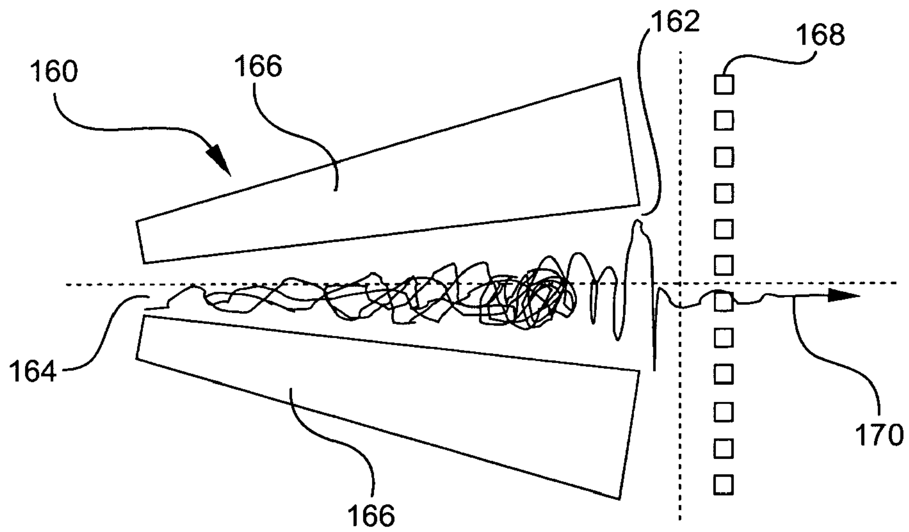
FIG. 14 is a schematic representation of a cross-section of yet another embodiment of an ion trap formed in accordance with the present invention.

FIG. 14 shows a further embodiment 160 of a one-armed ion trap formed in accordance with the present invention, with an ejection port 162 parallel to the injection port 164, providing axial ejection of the ions from the ion trap 160. The ion trap 160 includes two pairs of opposing electrodes 166 in the arm of any shape and geometry that will satisfy equation (1) and (2) as described herein. The ion trap 160 optionally includes a section of a linear conventional quadrupole (not shown), including two pairs of parallel opposing electrodes connected to the electrodes 166 and including the axial ejection port 164. The ion trap 160 also includes a mesh stopping plate 168, to which a DC potential is applied for containment of the ions during ramp up. The axial ejection can be achieved similarly by applying dipolar excitation and ramping up an RF voltage, for example, or by applying an auxiliary alternating current (AC) field to the plate 168 during ejection. Such methods are known in the art, and have been described, for example, in James W. Hager, "A New Linear Ion Trap Mass Spectrometer," *Rapid Commun. Mass Spectrom.*, Vol. 16, pp. 512-516 (2002). A simulated trajectory 170 of the ions is also provided in FIG. 14.

Figure 15:
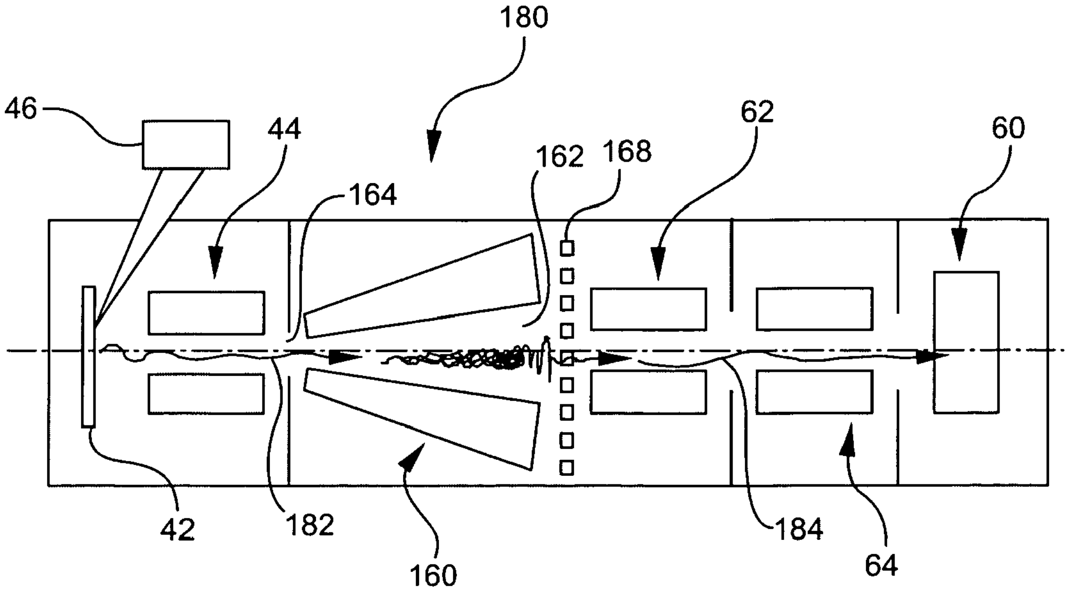
FIG. 15 is a schematic representation of a cross-section of yet another embodiment of a mass spectrometer of the present invention, which includes the ion trap of FIG. 14.

The ion trap 160 of FIG. 14 is incorporated into a mass spectrometer 180 formed in accordance with the present invention as shown in FIG. 15, in which the ions are injected along an axial path 182 into the injection port 164, selectively compressed into the wide region at the ejection port 162 and axially ejected along a path 184 en route to the detector 60.

The ion trap of the present invention is advantageously compact. Preferably, each arm of any of the embodiments of the ion trap has a length of 1 millimeter or more.

In another embodiment, each arm has a length of 50 millimeters or more.

In one embodiment, at least one arm of the ion trap is 1000 millimeters or less.

In another embodiment, at least one arm of the ion trap is 500 millimeters or less.

In another embodiment, the central insert or insert or section of linear conventional quadrupole including the ejection port is at least 1 millimeter long.

In yet another embodiment, the central insert or insert or section of linear conventional quadrupole including the ejection port is at least 50 millimeters long.

In another embodiment, the central insert or insert or section of linear conventional quadrupole including the ejection port is 1000 millimeters or less.

In yet another embodiment, the central insert or insert or section of linear conventional quadrupole including the ejection port is 500 millimeters or less.

Figure 16:
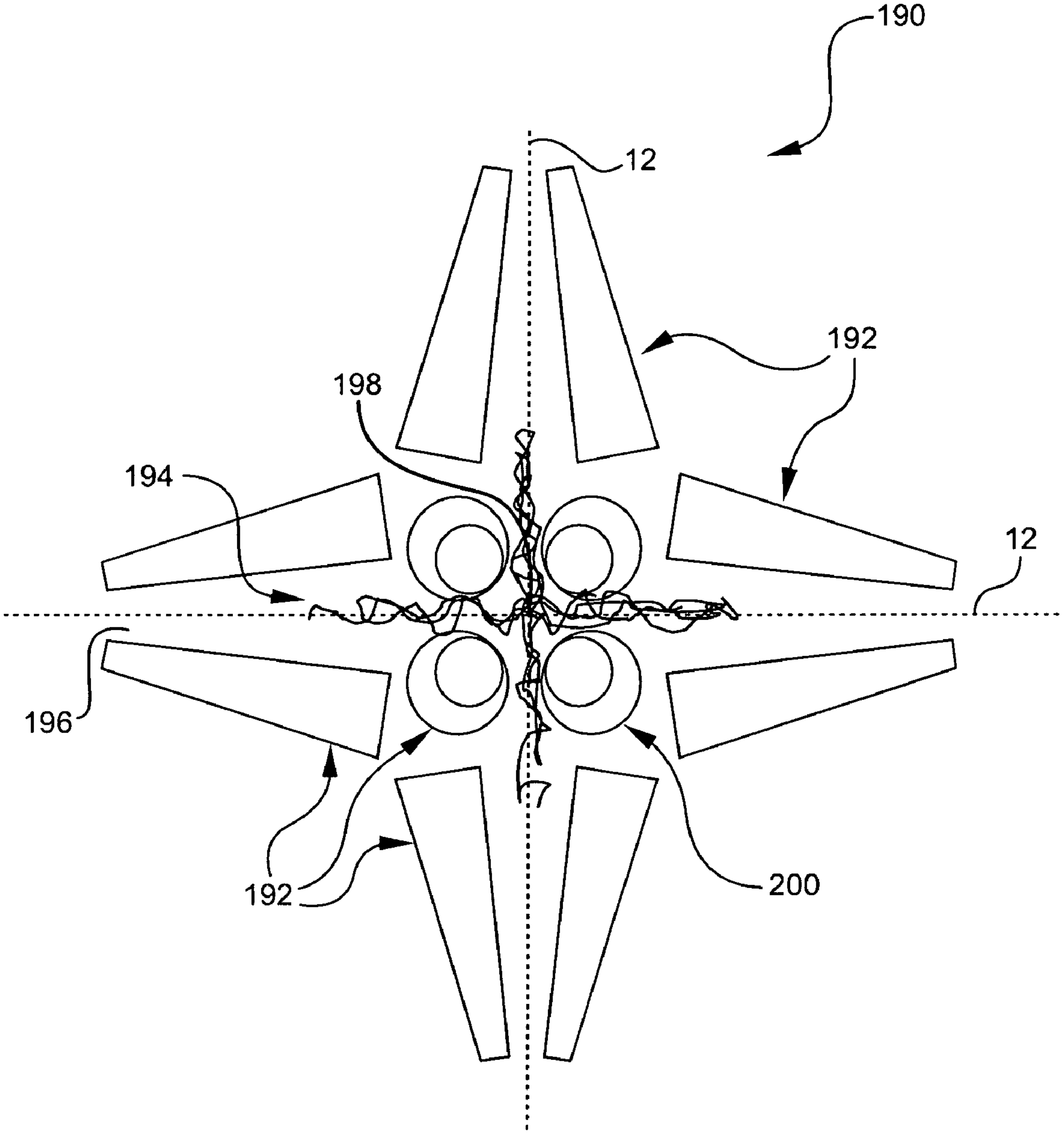
FIG. 16 is a schematic representation of a cross-section of an additional embodiment of an ion trap formed in accordance with the present invention.

An additional embodiment 190 of the ion trap of the present invention is provided in FIG. 16, which includes five arms 192 in a star configuration, each arm including two pairs of opposing electrodes tilted at some angle to the axis of symmetry 12 of each arm. As shown, the electrodes of each arm are preferably tapered, and may be tapered cylindrical rods as shown. The simulated ion trajectories 194 are shown. The injection port 196 may be along one or more of the axes of the four outer arms with wider ends facing inward. The ejection port is preferably oriented at the center 198 of the star configuration, and at the wide end of the central arm 200.

In addition to its usefulness in a mass spectrometer, the ion trap of the present invention may also be used for building ion-ion and ion-cation reactors.

In another embodiment, the ion trap of the present invention may be used to isolate ions for a given M/Z for other purposes such as optical spectroscopy or for use in preparative purification of compounds.

While there have been described what are presently believed to be the preferred embodiments of the invention, those skilled in the art will realize that changes and modifications may be made thereto without departing from the spirit of the invention, and is intended to claim all such changes and modifications as fall within the true scope of the invention.

What we claim is:

1. A method for manipulating ions in an ion trap, the method comprising:
- storing ions in the ion trap;
- spatially compressing the ions in a mass-to-charge ratio dependent manner; and
- ejecting the spatially compressed ions in a defined range of mass-to-charge ratios.

2. A method according to claim 1, wherein the ions are stored along a length of the ion trap.

3. A method according to claim 1, wherein the stored ions are cooled by collisions with molecules or atoms in a buffer gas.

4. A method according to claim 1, wherein the spatially compressed ions are ejected sequentially in accordance with their mass/charge ratios.

5. A method according to claim 1, further comprising providing a stronger quadrupole electric field at a first end of the ion trap than at a second end of the ion trap, wherein said spatially compressing comprises compressing the ions toward the second end.

6. A method according to claim 5, wherein said ejecting comprises ejecting the spatially compressed ions from a region in the second end.

7. A method according to claim 1, further comprising injecting the ions into the ion trap.

8. The method of claim 7, wherein said injecting comprises injecting the ions parallel to an axis of the ion trap.

9. The method of claim 7, wherein said injecting comprises injecting the ions orthogonally to an axis of the ion trap.

10. The method of claim 1, wherein said ejecting comprises ejecting the ions parallel to an axis of the ion trap.

11. The method of claim 1, wherein said ejecting comprises ejecting the ions orthogonally to an axis of the ion trap.

12. An ion trap comprising:
- an injection port for introducing ions into the ion trap;
- an arm comprising:
  - a first end and a second end; and
  - two pairs of opposing electrodes between the first end and the second end for confining the injected ions;
  - each electrode having an interior surface suitably shaped for providing a quadrupole electric field potential at any cross-section of the ion trap;
  - the distance between each opposing electrode increasing from the first end to the second end, whereby ions selected for ejection are spatially compressed into a region at the second end; and
- an ejection port for ejecting the spatially compressed ions from the second end of the arm of the ion trap.

13. The ion trap according to claim 12, wherein the first end and the second end are positioned and dimensioned so that a stronger quadrupole electric field is capable of being provided at the first end than at the second end.

14. An ion trap according to claim 12, further comprising:
- a second arm, the second arm comprising:
  - an additional first end and an additional second end; and
  - a second two pairs of opposing electrodes between the additional first end and additional second end.

15. An ion trap according to claim 14, further comprising:
- a central insert comprising a central two pairs of opposing electrodes, one of the central electrodes comprising the ejection port, wherein the opposing electrodes in the central insert are substantially parallel, and further wherein the second end of the arm and the additional second end of the second arm are operatively connected to either side of the central insert.

16. An ion trap according to claim 14, wherein a distance between each second opposing electrode increases from the additional first end of the second arm to the additional second end.

17. An ion trap according to claim 12, wherein a cross-sectional area of each electrode increases toward its second end.

18. An ion trap according to claim 12, wherein a cross section of each electrode defines a hyperbola, the interior surface of each opposing electrode comprising an inwardly curved profile.

19. An ion trap according to claim 18, wherein an acuteness of the hyperbola decreases from the first end toward the second end.

20. An ion trap according to claim 12, wherein a cross section of each electrode comprises at least a fraction of a circle, the interior surface of each opposing electrode forming an arc of the circle, and wherein the circle is centered at a point external to an interior area of the ion trap between the two pairs of opposing electrodes.

21. An ion trap according to claim 12, wherein a cross-section of each electrode defines a parabola, the interior surface of each opposing electrode comprising an inwardly curved profile, further wherein an acuteness of the parabola increases from the second end toward the first end.

22. An ion trap according to claim 12, wherein the injection port is suitably positioned to inject ions parallel to an axis of the ion trap.

23. An ion trap according to claim 12, wherein the injection port is suitably positioned to inject ions orthogonally to an axis of the ion trap.

24. An ion trap according to claim 12, wherein the ejection port is suitably positioned to eject ions substantially parallel to a direction of injection of the ions.

25. An ion trap according to claim 12, wherein the ejection port is suitably positioned to eject ions orthogonally to a direction of injection of the ions.

26. An ion trap according to claim 12, wherein the arm has a minimum length of 1 millimeter and a maximum length of 1000 millimeters.

27. An ion trap according to claim 14, wherein the central insert has a minimum length of 1 millimeter and a maximum length of 1000 millimeters.

28. An ion trap according to claim 14, wherein the second arm has a minimum length of 1 millimeter and a maximum length of 1000 millimeters.

29. An ion trap comprising:

two pairs of opposing electrodes, each pair being separated by a distance equal to twice an effective radius R of an electric field potential U(x,y,z); and a length L, wherein the two pairs of opposing electrodes are shaped to satisfy an equation (1) within the length L, the equation (1) being provided as follows:

$$U(x, y, z) = U_0\left(\frac{x^2 - y^2}{R^2}\right) + C, \quad (1)$$

further wherein the effective radius R varies as a function of a variable length z, the length L being measured along the z-axis, according to $$R = \frac{r_0}{\sqrt{1 + kz/L}}, \quad (2)$$

wherein the constants k, C and $r_0$, and additional constant $U_0$ are dimensioned to satisfy the equation (1) of the electric field potential for the chosen boundary condition.

30. An ion trap comprising:

an injection port for introducing ions into the ion trap;

a length L along which injected ions are stored, the length L being measured along a z-axis;

an arm comprising two pairs of opposing electrodes extending the length L and suitably shaped to confine the injected ions, wherein each pair of opposing electrodes is separated by a distance 2R, wherein R varies as a function of the variable z, the two pairs of opposing electrodes comprising a larger end and a smaller end, whereby ions selected for ejection are compressed toward the larger end; and an ejection port for ejecting the selected ions from the larger end.

31. The ion trap of claim 30, wherein each of the electrodes comprises a hyperbolic cross-sectional shape.

32. The ion trap of claim 31, wherein the eccentricity of the hyperbolic cross-section increases toward the smaller end.

33. The ion trap of claim 30, wherein each of the electrodes comprises a circular cross-sectional shape.

34. The ion trap of claim 33, wherein each of the electrodes is tapered and further wherein the circular cross-section of diameter D at each value 2R along the length satisfies an equation:

$$D = 1.148 \times 2R. \quad (4)$$

35. The ion trap of claim 30, wherein R corresponds to an effective radius R of an electric field potential U(x,y,z) and varies according to $$R = \frac{r_0}{\sqrt{1 + kz/L}}, \quad (2)$$

where k and $r_0$ are constants determined according to chosen boundary conditions for the electric field potential U(x,y,z).

36. The ion trap of claim 35, wherein the two pairs of opposing electrodes are shaped to satisfy an equation (1) within the length L, and wherein the constants k, C and $r_0$, and additional constant $U_0$ are dimensioned to satisfy the equation (1) of the electric field potential for the chosen boundary conditions, the equation (1) being provided as follows:

$$U(x, y, z) = U_o\left(\frac{x^2 - y^2}{R^2}\right) + C. \quad (1)$$

37. The ion trap of claim 30, wherein ions are selected for ejection according to a range of mass-to-charge ratios.

38. An ion mass spectrometer comprising the ion trap of claim 37.

* * * * *

UNITED STATES PATENT AND TRADEMARK OFFICE

CERTIFICATE OF CORRECTION

PATENT NO. : 7,323,683 B2
APPLICATION NO. : 11/216459
DATED : January 29, 2008
INVENTOR(S) : Krutchinsky et al.

It is certified that error appears in the above-identified patent and that said Letters Patent is hereby corrected as shown below:

IN THE SPECIFICATION:

Column 3, line 67, now reads "obtained with amass"
should read --obtained with a mass--

Signed and Sealed this

Seventeenth Day of June, 2008

JON W. DUDAS
*Director of the United States Patent and Trademark Office*